United States Patent
Watson et al.

(10) Patent No.: US 12,437,572 B2
(45) Date of Patent: Oct. 7, 2025

(54) METHOD AND SYSTEM FOR AUTOMATED PROCESSING AND CONTINUOUS DEPLOYMENT OF SUBPOENA EXTRACTION MODEL

(71) Applicant: JPMorgan Chase Bank, N.A., New York, NY (US)

(72) Inventors: William Watson, Long Beach, NY (US); Armineh Nourbakhsh, Pittsburgh, PA (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 372 days.

(21) Appl. No.: 17/991,321

(22) Filed: Nov. 21, 2022

(65) Prior Publication Data
US 2024/0169753 A1 May 23, 2024

(51) Int. Cl.
*G06V 30/416* (2022.01)
*G06F 16/93* (2019.01)
*G06F 40/284* (2020.01)
*G06Q 50/18* (2012.01)

(52) U.S. Cl.
CPC ............ *G06V 30/416* (2022.01); *G06F 16/93* (2019.01); *G06F 40/284* (2020.01); *G06Q 50/18* (2013.01)

(58) Field of Classification Search
CPC ...... G06V 30/416; G06V 30/10; G06V 30/40; G06F 16/2468; G06F 16/93; G06F 16/338; G06F 40/295; G06F 40/284; G06F 40/56; G06N 20/00; G06N 7/02; G06Q 50/18
See application file for complete search history.

(56) References Cited

U.S. PATENT DOCUMENTS

| | | | |
|---|---|---|---|
| 12,204,856 B1* | 1/2025 | Somasundaran | G06F 40/284 |
| 2010/0332520 A1* | 12/2010 | Lu | G06F 16/93 |
| | | | 707/769 |
| 2012/0254222 A1* | 10/2012 | Read | G06Q 10/10 |
| | | | 707/769 |
| 2021/0065320 A1* | 3/2021 | Bleiweiss | G06N 20/00 |
| 2022/0138572 A1* | 5/2022 | Song | G06N 3/045 |
| | | | 706/20 |
| 2023/0065089 A1* | 3/2023 | Lee | G06F 40/35 |

* cited by examiner

*Primary Examiner* — Bhavesh M Mehta
*Assistant Examiner* — Jangwoen Lee
(74) *Attorney, Agent, or Firm* — GREENBLUM & BERNSTEIN, P.L.C.

(57) ABSTRACT

A method and a system for preparing a response to a subpoena by using an automated subpoena processing and handling model is provided. The method includes: receiving a first subpoena; extracting a set of informational requests from the first subpoena; retrieving a data set from a memory; analyzing the first data set with respect to the set of informational requests in order to identify items from within the data set that are responsive to items included within the set of informational requests; and generating a report that includes a result of the analysis. The analysis is performed by providing the first subpoena as an input to a Robustly optimized Bidirectional Encoder Representations from Transformers pre-training approach (RoBERTa) model that uses a sub-word approach to modeling words in a sequential format.

16 Claims, 5 Drawing Sheets

METHOD AND SYSTEM FOR AUTOMATED PROCESSING AND CONTINUOUS DEPLOYMENT OF SUBPOENA EXTRACTION MODEL

BACKGROUND

1. Field of the Disclosure

This technology generally relates to methods and systems for automated processing and continuous deployment of subpoena extraction models so as to ensure accuracy, completeness, and timeliness with respect to compliance with subpoena requirements.

2. Background Information

Subpoenas are written summonses issued by government agencies, often a court or law enforcement agency, to produce evidence under a penalty for failure to comply therewith. In many instances, a type of subpoena that is received is classified as a subpoena duces tecum, which is an official order to bring physical evidence before the ordering authority. It is key that when subpoenas are received, they are handled with the upmost urgency and completeness.

With respect to handling and processing of subpoenas, there are several aspects that must be accounted for. These include the following: 1) Format: Subpoenas can be digital or scanned. Scanned subpoenas present additional challenges as compared with digital subpoenas. 2) Completeness: Extracting all related information necessary for compliance with the order. This task requires high recall to cover all mentioned entities for review. 3) Scale: For a large financial institution with a global presence, it is generally expected that many subpoenas will be received daily, and that each one must be processed, catalogued, and responded to in a timely manner. 4) Diversity: In view of the large number of subpoenas that are received every day, typically subpoenas are received from hundreds of unique requesting authorities, each with its own distinct style. As a result, it is important that a generalized solution that extends to a variety of layouts is provided for handling subpoenas.

Accordingly, there is a need for a method for automated processing and continuous deployment of subpoena extraction models so as to ensure accuracy, completeness, and timeliness with respect to compliance with subpoena requirements.

SUMMARY

The present disclosure, through one or more of its various aspects, embodiments, and/or specific features or sub-components, provides, inter alia, various systems, servers, devices, methods, media, programs, and platforms for automated processing and continuous deployment of subpoena extraction models so as to ensure accuracy, completeness, and timeliness with respect to compliance with subpoena requirements.

According to an aspect of the present disclosure, a method for preparing a response to a subpoena is provided. The method is implemented by at least one processor. The method includes: receiving, by the at least one processor, a first subpoena; extracting, by the at least one processor from the first subpoena, a first plurality of informational requests; retrieving, by the at least one processor from a memory, a first data set; analyzing, by the at least one processor, the first data set with respect to the first set of informational requests in order to identify items from within the first data set that are responsive to items included within the first set of informational requests; generating, by the at least one processor, a report that includes a result of the analyzing; and transmitting, by the at least one processor to a predetermined destination, the report.

The analyzing may include applying a fuzzy matching algorithm to link items from within the first data set with items from within the first set of informational requests.

The analyzing may further include providing the first subpoena as an input to a Robustly optimized Bidirectional Encoder Representations from Transformers pre-training approach (RoBERTa) model that uses a sub-word approach to modeling words in a sequential format.

The RoBERTa model may use a sliding window that includes 64 tokens that include 48 tokens included at the end of a previous window and 16 tokens that occur sequentially after the 48 tokens included at the end of the previous window.

The RoBERTa model may be generated by: retrieving a plurality of second subpoenas for which responses have previously been generated; extracting, from each respective second subpoena of the plurality of second subpoenas, a first set of tokens; determining, for each respective token from within the first set of tokens, a corresponding set of spatial information that relates to a location of the respective token within the respective second subpoena; and assigning, for each respective token from within the first set of tokens, a corresponding tag that indicates a type of information from among a predetermined set of information types.

The RoBERTa model may generate, as an output, a calibration score that relates to a confidence level of the linkage of the items from within the first data set with items from within the first set of informational requests.

The first set of informational requests may include first information that relates to an authority associated with the first subpoena, second information that relates to a subject of the first subpoena, and third information that relates to at least one account associated with the subject of the first subpoena.

The first information may include at least one from among a requestor name and a requestor address.

The second information may include at least one from among a name of a person, a name of an organization, an address, a social security number, a tax identification number, and a date of birth.

The third information may include at least one from among information that relates to a credit card account, information that relates to a debit card account, information that relates to a checking account, and a financial identifier.

According to another exemplary embodiment, a computing apparatus for preparing a response to a subpoena is provided. The computing apparatus includes a processor; a memory; and a communication interface coupled to each of the processor and the memory. The processor is configured to: receive, via the communication interface, a first subpoena; extract, from the first subpoena, a first plurality of informational requests; retrieve, from the memory, a first data set; analyze the first data set with respect to the first set of informational requests in order to identify items from within the first data set that are responsive to items included within the first set of informational requests; generate a report that includes a result of the analysis; and transmit the report to a predetermined destination via the communication interface.

The processor may be further configured to apply a fuzzy matching algorithm to link items from within the first data set with items from within the first set of informational requests.

The processor may be further configured to provide the first subpoena as an input to a Robustly optimized Bidirectional Encoder Representations from Transformers pre-training approach (RoBERTa) model that uses a sub-word approach to modeling words in a sequential format.

The RoBERTa model may use a sliding window that includes 64 tokens that include 48 tokens included at the end of a previous window and 16 tokens that occur sequentially after the 48 tokens included at the end of the previous window.

The processor may be further configured to generate the RoBERTa model by: retrieving a plurality of second subpoenas for which responses have previously been generated; extracting, from each respective second subpoena of the plurality of second subpoenas, a first set of tokens; determining, for each respective token from within the first set of tokens, a corresponding set of spatial information that relates to a location of the respective token within the respective second subpoena; and assigning, for each respective token from within the first set of tokens, a corresponding tag that indicates a type of information from among a predetermined set of information types.

The RoBERTa model may generate, as an output, a calibration score that relates to a confidence level of the linkage of the items from within the first data set with items from within the first set of informational requests.

The first set of informational requests may include first information that relates to an authority associated with the first subpoena, second information that relates to a subject of the first subpoena, and third information that relates to at least one account associated with the subject of the first subpoena.

The first information may include at least one from among a requestor name and a requestor address.

The second information may include at least one from among a name of a person, a name of an organization, an address, a social security number, a tax identification number, and a date of birth.

The third information may include at least one from among information that relates to a credit card account, information that relates to a debit card account, information that relates to a checking account, and a financial identifier.

According to yet another exemplary embodiment, a non-transitory computer readable storage medium storing instructions for preparing a response to a subpoena is provided. The storage medium includes executable code which, when executed by a processor, causes the processor to: receive a first subpoena; extract, from the first subpoena, a first plurality of informational requests; retrieve, from a memory, a first data set; analyze the first data set with respect to the first set of informational requests in order to identify items from within the first data set that are responsive to items included within the first set of informational requests; generate a report that includes a result of the analysis; and transmit the report to a predetermined destination.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
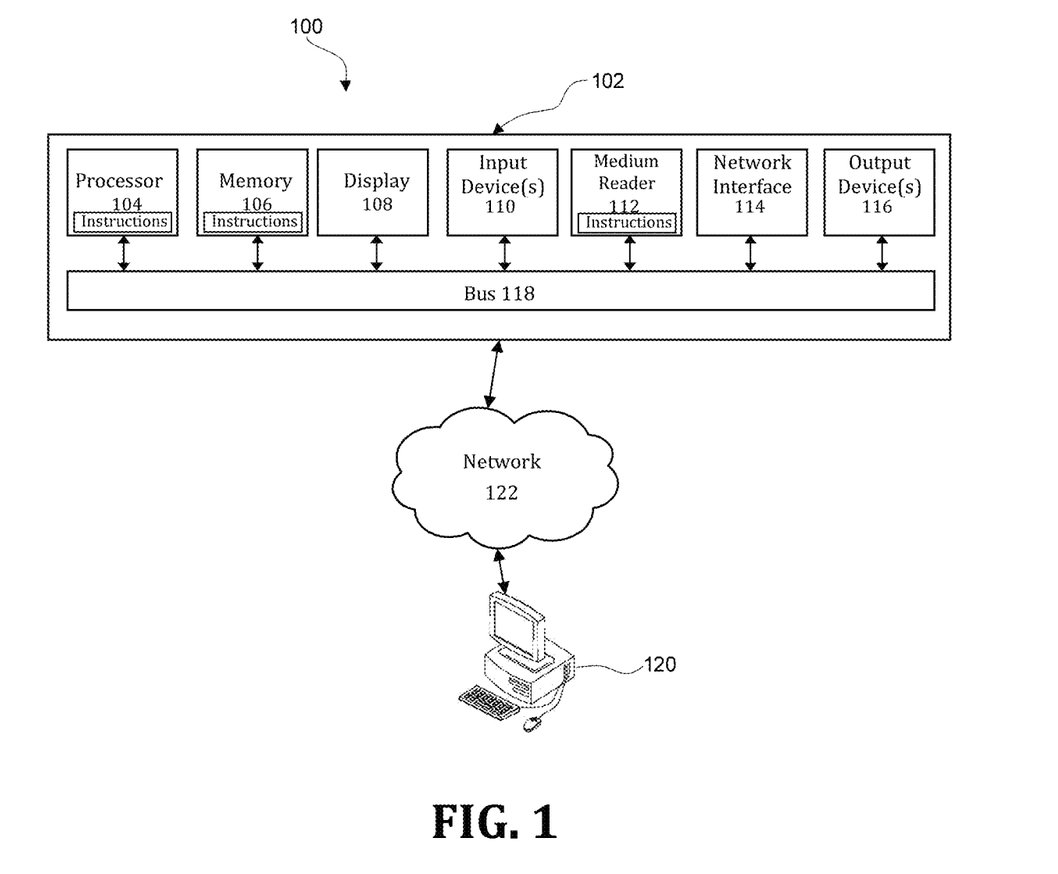
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automated processing and continuous deployment of subpoena extraction models so as to ensure accuracy, completeness, and timeliness with respect to compliance with subpoena requirements.

Figure 2:
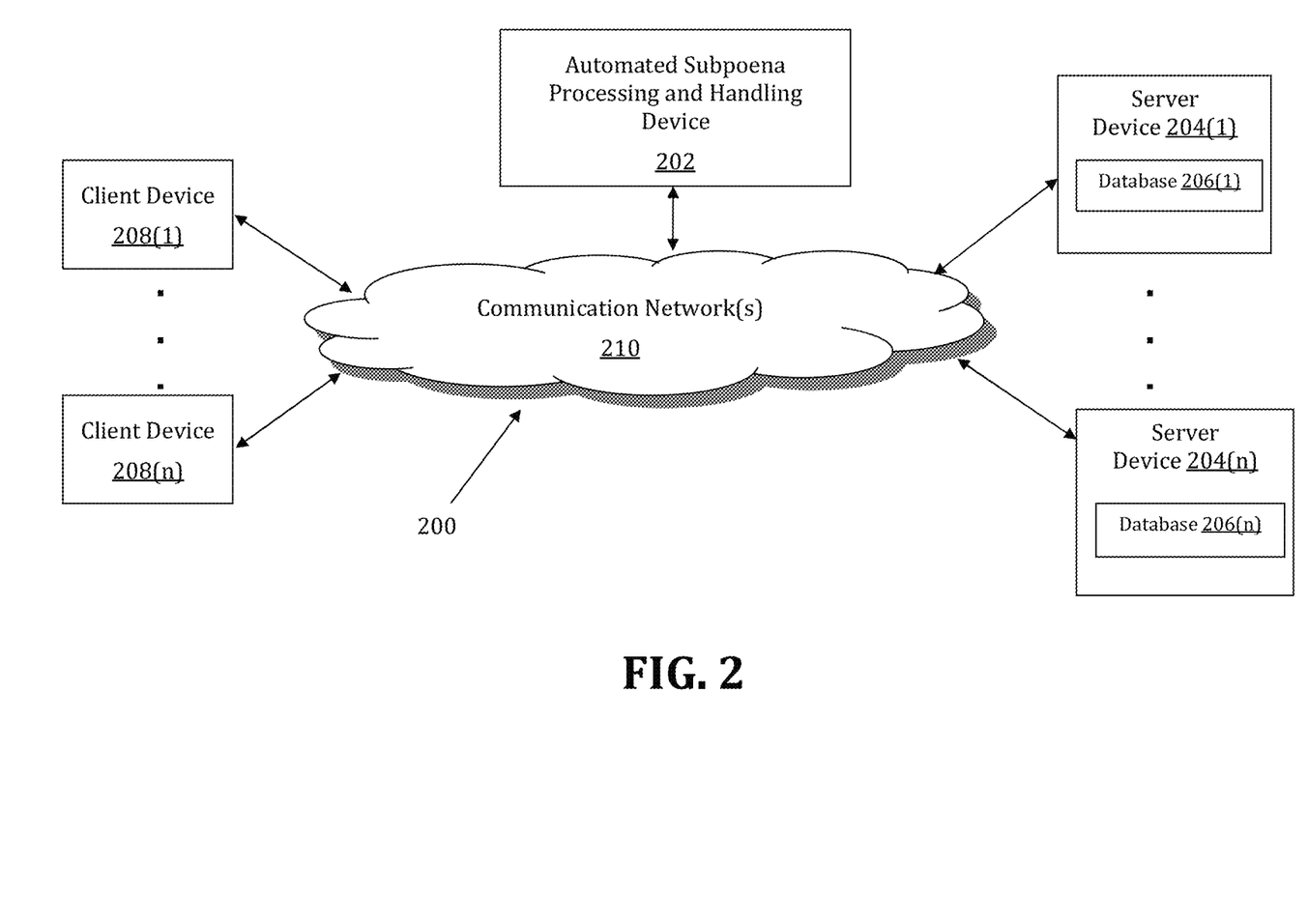
FIG. 2 illustrates an exemplary diagram of a network environment.

Referring to FIG. 2, a schematic of an exemplary network environment 200 for implementing a method for automated processing and continuous deployment of subpoena extraction models so as to ensure accuracy, completeness, and timeliness with respect to compliance with subpoena requirements is illustrated. In an exemplary embodiment, the method is executable on any networked computer platform, such as, for example, a personal computer (PC).

The method for automated processing and continuous deployment of subpoena extraction models so as to ensure accuracy, completeness, and timeliness with respect to compliance with subpoena requirements may be implemented by an Automated Subpoena Processing and Handling (ASPH) device 202. The ASPH device 202 may be the same or similar to the computer system 102 as described with respect to FIG. 1. The ASPH device 202 may store one or more applications that can include executable instructions that, when executed by the ASPH device 202, cause the ASPH device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASPH device 202 itself, may be located in virtual server(s) running in a cloud-based computing environment rather than being tied to one or more specific physical network computing devices. Also, the application(s) may be running in one or more virtual machines (VMs) executing on the ASPH device 202. Additionally, in one or more embodiments of this technology, virtual machine(s) running on the ASPH device 202 may be managed or supervised by a hypervisor.

In the network environment 200 of FIG. 2, the ASPH device 202 is coupled to a plurality of server devices 204(1)-204(n) that hosts a plurality of databases 206(1)-206(n), and also to a plurality of client devices 208(1)-208(n) via communication network(s) 210. A communication interface of the ASPH device 202, such as the network interface 114 of the computer system 102 of FIG. 1, operatively couples and communicates between the ASPH device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASPH device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ASPH devices that efficiently implement a method for automated processing and continuous deployment of subpoena extraction models so as to ensure accuracy, completeness, and timeliness with respect to compliance with subpoena requirements.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASPH device 202 may be a standalone device or integrated with one or more other devices or apparatuses, such as one or more of the server devices 204(1)-204(n), for example. In one particular example, the ASPH device 202 may include or be hosted by one of the server devices 204(1)-204(n), and other arrangements are also possible. Moreover, one or more of the devices of the ASPH device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204

(n) may include, among other features, one or more processors, a memory, and a communication interface, which are coupled together by a bus or other communication link, although other numbers and/or types of network devices may be used. The server devices 204(1)-204(n) in this example may process requests received from the ASPH device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store customer-specific information that relates to financial accounts and data that relates to subpoena formats and layouts.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ASPH device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ASPH device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ASPH device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASPH device 202, the server devices 204(1)-204(n), or the client devices 208(1)-208(n), for example, may be configured to operate as virtual instances on the same physical machine. In other words, one or more of the ASPH device 202, the server devices 204(1)-204(n), or the client devices 208(1)-208(n) may operate on the same physical device rather than as separate devices communicating through communication network(s) 210. Additionally, there may be more or fewer ASPH devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
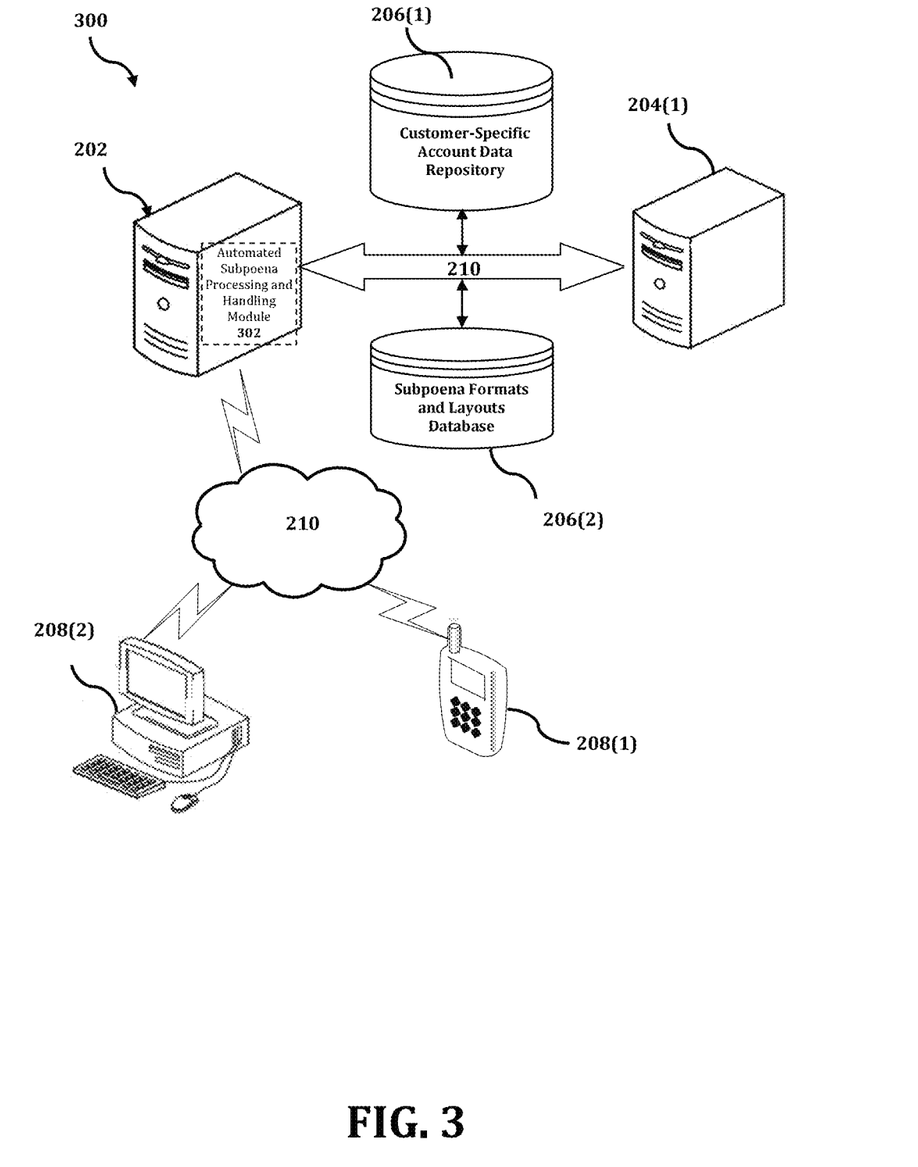
FIG. 3 shows an exemplary system for implementing a method for automated processing and continuous deployment of subpoena extraction models so as to ensure accuracy, completeness, and timeliness with respect to compliance with subpoena requirements.

The ASPH device 202 is described and illustrated in FIG. 3 as including an automated subpoena processing and handling module 302, although it may include other rules, policies, modules, databases, or applications, for example. As will be described below, the automated subpoena processing and handling module 302 is configured to implement a method for automated processing and continuous deployment of subpoena extraction models so as to ensure accuracy, completeness, and timeliness with respect to compliance with subpoena requirements.

An exemplary process 300 for implementing a mechanism for automated processing and continuous deployment of subpoena extraction models so as to ensure accuracy, completeness, and timeliness with respect to compliance with subpoena requirements by utilizing the network environment of FIG. 2 is illustrated as being executed in FIG. 3. Specifically, a first client device 208(1) and a second client device 208(2) are illustrated as being in communication with ASPH device 202. In this regard, the first client device 208(1) and the second client device 208(2) may be "clients" of the ASPH device 202 and are described herein as such. Nevertheless, it is to be known and understood that the first client device 208(1) and/or the second client device 208(2) need not necessarily be "clients" of the ASPH device 202, or any entity described in association therewith herein. Any additional or alternative relationship may exist between either or both of the first client device 208(1) and the second client device 208(2) and the ASPH device 202, or no relationship may exist.

Further, ASPH device 202 is illustrated as being able to access a customer-specific account data repository 206(1) and a subpoena formats and layouts database 206(2). The automated subpoena processing and handling module 302 may be configured to access these databases for implementing a method for automated processing and continuous deployment of subpoena extraction models so as to ensure accuracy, completeness, and timeliness with respect to compliance with subpoena requirements.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASPH device 202 via broadband or cellular communication. Of course, these embodiments are merely exemplary and are not limiting or exhaustive.

Upon being started, the automated subpoena processing and handling module 302 executes a process for automated processing and continuous deployment of subpoena extraction models so as to ensure accuracy, completeness, and timeliness with respect to compliance with subpoena requirements. An exemplary process for automated processing and continuous deployment of subpoena extraction models so as to ensure accuracy, completeness, and timeliness with respect to compliance with subpoena requirements is generally indicated at flowchart 400 in FIG. 4.

Figure 4:
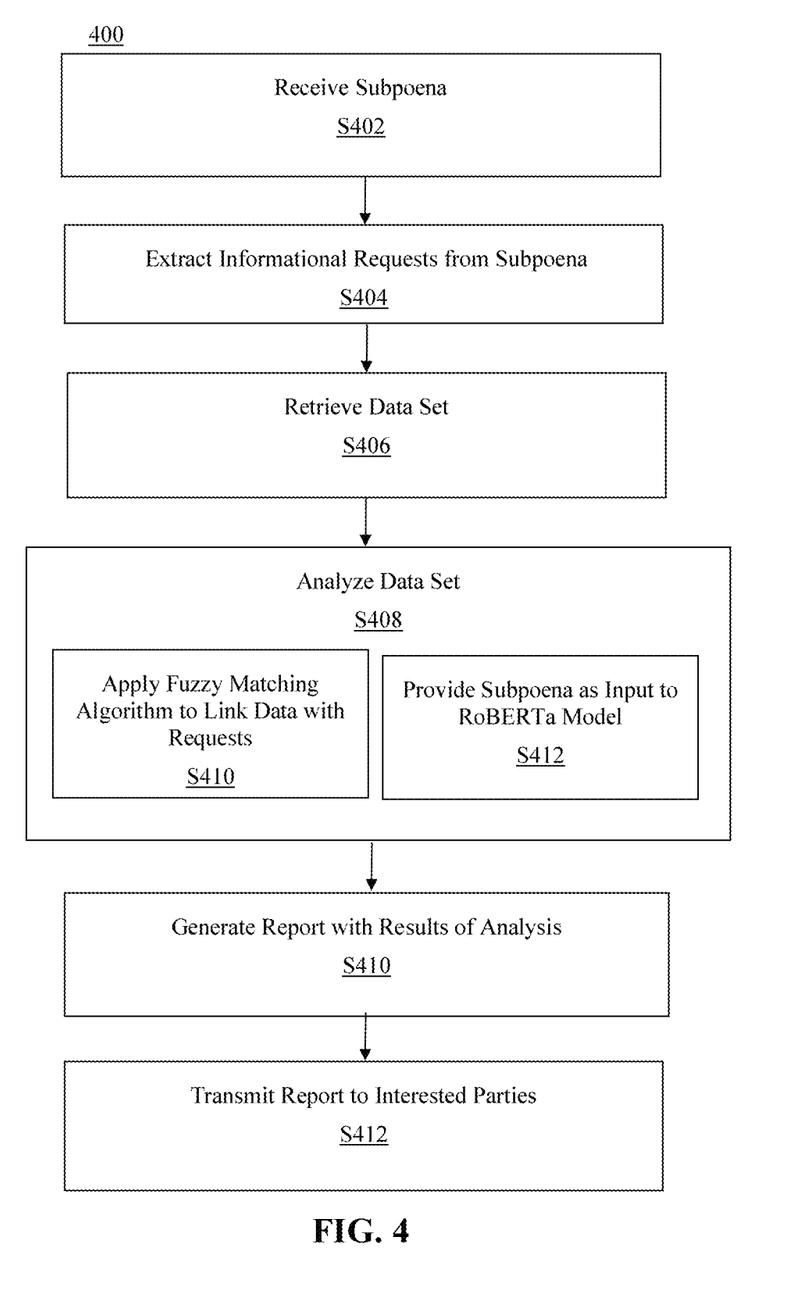
FIG. 4 is a flowchart of an exemplary process for implementing a method for automated processing and continuous deployment of subpoena extraction models so as to ensure accuracy, completeness, and timeliness with respect to compliance with subpoena requirements.

In process 400 of FIG. 4, at step S402, the automated subpoena processing and handling module 302 receives a subpoena. Then, at step S404, the automated subpoena processing and handling module 302 extracts a set of informational requests from the subpoena. In an exemplary embodiment, the informational requests include at least three types of information, i.e., first information that relates to an authority associated with the subpoena, such as a requestor; second information that relates to a subject of the subpoena; and third information that relates to an account associated with the subject of the subpoena. For example, the first information may include a name and/or an address of the requestor; the second information may include any one or more of a name of a person, a name of an organization, an address, a social security number, a tax identification number, and/or a date of birth; and the third information may include information that relates to a credit card account, a debit card account, a checking account, a financial identifier, and/or any other suitable type of account information.

At step S406, the automated subpoena processing and handling module 302 retrieves a data set from a memory, such as, for example, customer-specific account data repository 206(1). The data set may include information that is responsive to one or more of the informational requests extracted in step S404.

At step S408, the automated subpoena processing and handling module 302 analyzes the data set retrieved in step S406 with respect to the informational requests extracted in step S404 in order to identify items within the data set that are responsive to any of the requests. The analysis may include step S410, in which the automated subpoena processing and handling module applies a fuzzy matching algorithm in order to link items from within the data set with items included in the informational requests.

At step S412, also included within the analysis of step S408, the automated subpoena processing and handling module 302 provides the subpoena as an input to a Robustly optimized Bidirectional Encoder Representations from Transformers pre-training approach (RoBERTa) model that uses a sub-word approach to modeling words in a sequential format. In an exemplary embodiment, the RoBERTa model uses a sliding window that includes 64 tokens, including 48 tokens included at the end of a previous window and 16 tokens that occur sequentially after the 48 tokens from the end of the previous window. In an exemplary embodiment, the RoBERTa model generates an output that includes a calibration score that indicates a confidence level of the linkage between items in the data set and the corresponding informational requests.

In an exemplary embodiment, the automated subpoena processing and handling module 302 generates the RoBERTa model as follows: First, a historical set of subpoenas for which responses have previously been generated is retrieved. A set of tokens is extracted from each subpoena included in the historical set. Then, for each respective token, the automated subpoena processing and handling module 302 then determines a corresponding set of spatial information that relates to a physical location of the respective token within the subpoena, such as, for example, a pixel offset, a width, a height, a line number, a block association, an extraction confidence level, and/or which extraction stream was used. The automated subpoena processing and handling module then assigns a corresponding tag to each respective token that indicates a type of information of the respective token. For example, the tag may include any one of the following: authority; authority address; subject; organization; account; address; social security number; date of birth.

At step S414, the automated subpoena processing and handling module 302 generates a report that includes a result of the analysis performed in step S408. Then, at step S416, the automated subpoena processing and handling module 302 transmits the report to at least one predetermined destination, such as, for example, an interested party and/or a party that is responsible for responding to the subpoena.

Modern deep leaning algorithms require massive amounts of data to learn at a scale acceptable for human users. To facilitate this development, in an exemplary embodiment, a deep learning algorithm that is employed by a model that is designed to process and handle subpoenas is trained by using historical data that is sourced from thousands of catalogued subpoenas. In an exemplary embodiment, a set of eight (8) separate Structured Query Language (SQL) queries is used to gather all pertinent data onto a single platform.

Each subpoena has an associated file content, relationships, and subject/account information. The historical database is queried to gather all the pertinent metadata joined on a unique identifier of each subpoena. In an exemplary embodiment, this query process, a set of over 58,000 subpoena Portable Document Format (PDF) files, totaling over 390K pages of content, has been obtained, thereby enabling a further process of gathering pseudo-labels and information that is critical for training a model in accordance with an exemplary embodiment.

In an exemplary embodiment, the items of interest may be trifurcated into the following groups: Authorities, Subjects, and Accounts. Authorities include a Requestor Name or Entity with the Requesting Authorities Address. Subjects may be either a Person or an Organization, and may or may not have associated identifying information, such as Addresses, Social Security Numbers (SSNs), Tax Identification Numbers (i.e., Tax IDs), and Dates of Birth (DOBs). In an exemplary embodiment, Tax IDs may treated in the same way as SSNs, and the two may be differentiated the underlying pattern. Finally, the last group are Accounts, which include Credit Cards, Debit Cards, Checking Accounts, and other financial identifiers that are not subject identifiers.

Before a subpoena is able to be processed, the machine must first understand what content it is reading. In this aspect, the first fundamental limitation is relates to the format of the subpoena. PDF formats come in two main varieties: digital or scanned. For digital documents, the internal text structure can be parsed from the encoded metadata contained within the file. However, for scanned forms, this information is locked away behind a cumbersome pixelated format that may be manipulated as images. Therefore, a machine must employ Optical Character Reader (OCR) technology to discover areas of pixels that can be interpreted as text. This is especially common for older subpoenas and documents that include hand-written notes and/or signatures.

In an exemplary embodiment, in order to bridge the divide between these two formats, a dual-stream PDF parser is employed. The dual-stream PDF parser has the following capabilities: 1) Discovery as to whether a PDF is machine-readable; 2) if yes, then read the encoded metadata; and 3) if no, then run an OCR process to convert text in images to machine-readable text.

In an exemplary embodiment, the PDF parser is asynchronous and is able to exploit parallelization at the document and page level. In addition, the dual stream format resolution allows all documents to have a standardized format for subsequent processing. As a result, the dual-stream pdf parser facilitates a reading of all types of ingested subpoena documents into a unified format for processing.

Each word that is extracted in the PDF also contains important spatial information, including a pixel offset (left/top), width, height, line number, block association, extraction confidence, and which extraction stream was used. Each page may then be condensed into a dataframe for storage and downstream processing. In an exemplary embodiment, the resulting data set may include over 106 million tokens.

Curating a "Gold" Data Set: The historical subpoena database includes documents that may be linked through a unique identifier to associated subjects, requestors, organizations, accounts, and other related items of interest. However, the explicit link and match from the PDF content to the end-state items may not be retained. In addition, OCR parsing may return corrupted, misspelled, or missing data that may cause occasional mismatches with labels. Hence, in an exemplary embodiment, a fuzzy regular expression matching algorithm may be used in order to link known items of interests to the corresponding text occurrences in the PDF.

For instance, a subpoena may contain information related to a John Doe, SSN 123-45-6789, DOB Jan. 2, 1990, at a specific address. What is missing is where these items occur in the document. For each subpoena, each data point may be searched and matched with a sequence of text. Fuzzy matching allows some flexibility to account for minor errors in the text retrieval process. However, too much flexibility could pollute the generated labels. In an exemplary embodiment, the system relies on high quality samples to extrapolate patterns to missed matches, a procedure that is referred to herein as "filling in the blank." The samples may be constructed to represent an incomplete sampling of high quality, representative examples, thus yielding a powerful paradigm to learn generalized patterns without overfitting.

In an exemplary embodiment, from among 58,826 PDFs encompassing 390,600 pages, 201,658 pages (i.e., 51.6%) were identified as containing an item of interest that should be tagged and extracted, and 188,942 had no matched content. In this aspect, partly as a result of the use of fuzzy matching algorithms, some of the negative samples may actually be false negatives.

Furthermore, the dataset includes over 106 million tokens that have been matched, linked, and labeled based on a predetermined set of pseudo-labels. The use of a fuzzy matching algorithm identified over 1.5 million tokens that could be labeled, and these represented a total of over 490 thousand unique entities. An entity is a unique umbrella link for a set of tokens that can describe said entity. For example, an address may have a street number, street name, city, state, country, and zip code, and as a result, 15 thousand addresses may be composed of nine times more tokens, or 140 thousand words. By contrast, SSNs and Dates of Birth generally correspond to a single token and therefore achieve parity in the number of entities and tokens. Further, because completeness is an important objective, the reported frequencies are an undercount of the true landscape, and the modeling approach thus surfaces and augments these frequencies by filling in the blank.

TABLE 1

Frequency breakdown of unique entities and component tokens.

| Type of Tag | Entities | Tokens |
| --- | --- | --- |
| Authorities | 217,271 | 783,302 |
| Authority Addresses | 44,010 | 260,384 |
| Subjects | 112,159 | 209,069 |
| Organizations | 13,525 | 64,240 |
| Accounts | 43,873 | 59,468 |
| Addresses | 15,742 | 139,083 |
| SSNs | 27,098 | 28,550 |
| Dates of Birth | 17,540 | 19,281 |
| Total Tags | 491,218 | 1,563,337 |
| Not of Interest | — | 105,047,116 |
| Grand Totals | 491,218 | 106,610,493 |

Figure 5:
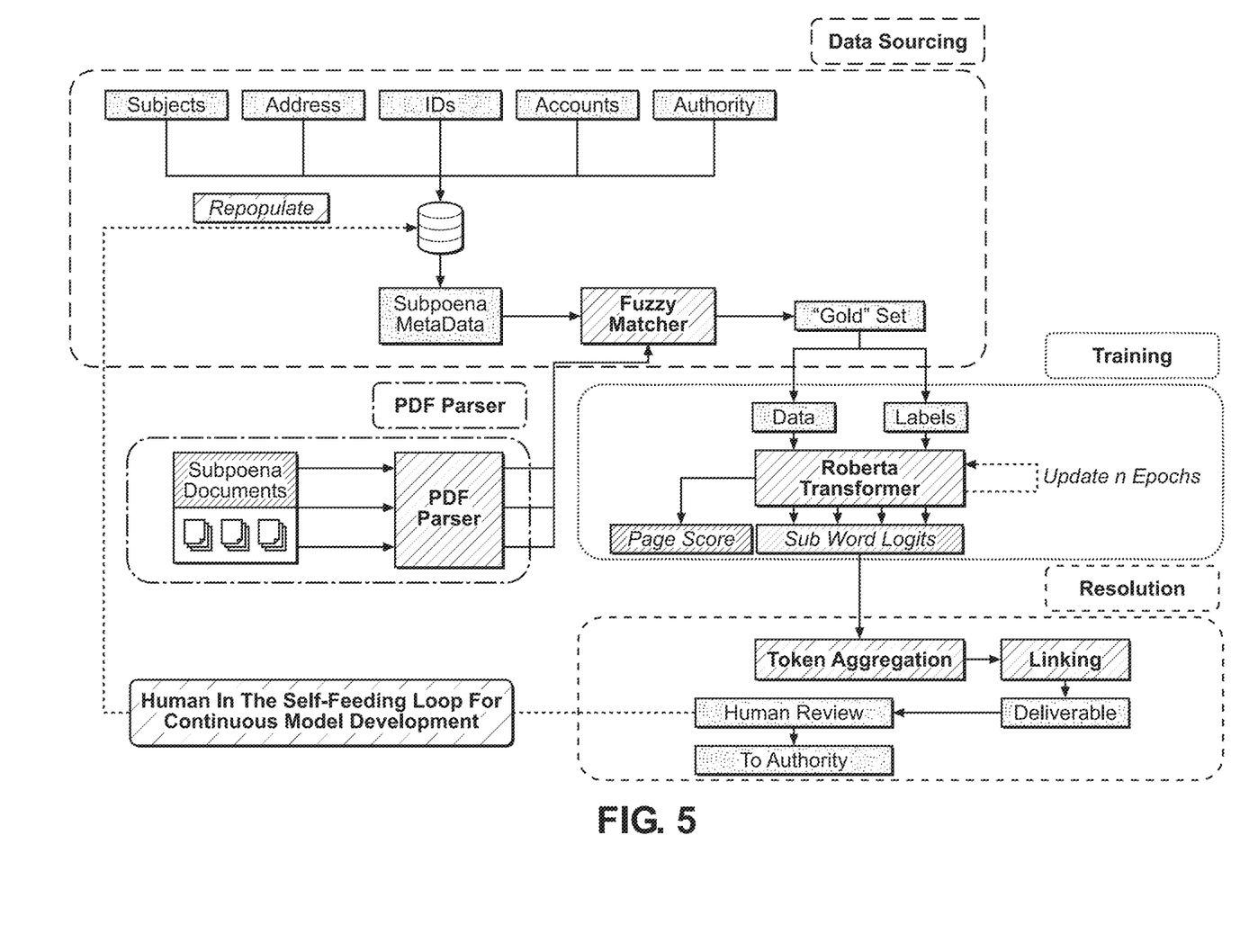
FIG. 5 is a diagram that illustrates a data flow for a system that implements a method for automated processing and continuous deployment of subpoena extraction models so as to ensure accuracy, completeness, and timeliness with respect to compliance with subpoena requirements, according to an exemplary embodiment.

FIG. 5 is a diagram 500 that illustrates a data flow for a system that implements a method for automated processing and continuous deployment of subpoena extraction models so as to ensure accuracy, completeness, and timeliness with respect to compliance with subpoena requirements, according to an exemplary embodiment.

Referring to FIG. 5, in an exemplary embodiment, the model is a modified RoBERTa transformer. This architecture gives a sequence-level classification head together with variable-length sub-word token classifications. A sub-word approach to modeling words in sequential format is employed. Sub-words are effectively the most frequent sub-sequences of text, thus facilitating an ability to model pieces of a word, instead of an entire token. This is critical to the privacy of the individual data passed into the model. For instance, an SSN is unique to a person. If each input is viewed as a token, then every SSN would be unknown and unpredictable to the model. Sub-words allow for effective representations of concise patterns, such as the XXX-XX-XXXX sequence for SSNs. Because the model is context aware, each token uses information from its left and right context in a learned self-attention mechanism.

To incorporate the text of the entire page, a stride window of width 64 is used. This overcomes an inherent limitation of sequence size, i.e., only being able to handle 512 tokens per input. For any example over 512 tokens, the example is divided into chunks, while allowing for an overlap of 64 tokens. It is critical to allow for some context to leak into the next slice of data as "burn in," and only the last 16 tokens of the 64 token burn in window are taken from the front, but 48 tokens in the ending window, as this allows for sufficient context for accurate predictions without cutoff.

As described above, the training data is incomplete and only represents a subset of the true labels. This problem may be navigated by prioritizing recall (i.e., recovering known tags) instead of precision (i.e., minimizing extraneous predictions). In this aspect, high recall and low precision is an ideal goal for this task. This ensures that the portions that human compliance officers have extracted are covered, and also allows for expanding into what may have been missed and filling in the blanks from previously unknown tags. This may be achieved by adjusting the class weights for token classification by the inverse frequency. For example, a social security number would have an amplified loss by a factor of 3532.412 times, while normal tokens have a loss amplified by a factor of 1.014. This effectively prioritizes the model to learn each sub-pattern for the tags being prioritized, and the optimal state would be for the model to mis-tag tokens that look similar to SSNs if the model can accurately cover all of the matched SSNs. Effectively, the model learns that it is okay to be incorrect as long as impressive recall is achieved.

Pretraining Objective: To facilitate knowledge regarding what sequence of words contributes to important text to extraction, a page-level objective is adopted in order to predict the confidence that a page contains any item of interest. Labels are built from the fuzzy matches procured when creating the dataset. If any label (i.e., Name, Organization, Requestor, SSN, etc.) appears in the batch item, then the page label corresponds to 1. Otherwise, a lack of any found items causes the batch item to be assigned a label of 0, or no information to consider.

Tagging Objective and Smart Update: This is a recall task, in which all discovered labels should be efficiently recovered even when certain labels are over-predicted on non-labeled tokens. This allows models to achieve completeness on the known matched set, extrapolating to what is unknown. Hence precision will naturally be low, but is still a useful metric to gauge the human-only approach to completeness.

Precision & Recall—Filling in the blanks: In an exemplary embodiment, over 99% of structured tags such as DOB, SSN, and Requestor are recovered. For more varied tags such as address, the recall success rate is only 93%, as they are very long and run the risk of missing a zip code, or apartment identifier. Names and organization names are unique per subpoena and lack any inherent structure—thus the model must rely exclusively on context clues to recover the tokens fully. Hence the lowest recall is achieved on these two tags. Precision is relatively low for each tag as a result of filling in the blanks. This stems from the incompleteness of the original data and the need for the model to highlight names and addresses that could not be originally matches by the fuzzy matching algorithm.

Sub-word Aggregation: Outputs are broken across tokens into sub-word tokens. These are aggregated by taking the composite sub-word predictions and averaging. This yields a strong signal for a token, and can prevent simple errors if one or two sub-words are not tagged appropriately in a larger context.

Linking: In an exemplary embodiment, a spatially and contextually aware linking algorithm is employed in order to segment tokens into items and link items into a combined subject. For instance, a Subject may have an address, SSN, and DOB that should be linked to each other, while maintaining the class segmentation as to which piece of text corresponds to an SSN or DOB. Linking differs with respect to whether subjects are listed in a dense text format or in a tabular format where there is more space between items. First, a determination is made as to whether the retrieved tokens could be in a tabular format. By examining the spatial alignment of relevant tokens, two patterns merge. Tabular format is distinct in that it aligns very well with other tokens in a repeatable pattern. By contrast, tokens that are in dense paragraph format appear more randomly in their locations. A histogram of spatial alignments and coordinates may be compared against a uniform distribution via the Kullback-Leibler (KL) divergence, and if the difference is significant, it is assumed that the content is in a table; otherwise it is assumed that the content is in a dense paragraph format. Secondly, deterministic rules are employed to decide whether or not a sequence of tags should be linked. For example, tags in a table format may have longer width spaces but should generally align per row. Tags in dense paragraphs may be spread out across lines. Several heuristics may also be used to generate good alignments. For example, a name or organization signals the start of a new subject, while credit card account numbers must be 16 digits. These rules augment the spatial relationships of the tags.

The linking algorithm also employs a learnable graph-based linking module that can be jointly trained with the tagging procedure. Tokens that are predicted to be of value are taken as a subset of the total page content, while tokens that are predicted to be extraneous are ignored. By exploiting learned contextual embeddings, information type predictions, and spatial alignments, the model self-organizes predicted tokens into entity groups. These groups consist of a set of aligned tokens, each with a pairwise calibration score representing the strength of the alignment. These scores are used as an additional reference point in the linking algorithm as described—augmenting deterministic and heuristic based measures with learned representations from the context.

Deployment: In an exemplary embodiment, PDF documents are ingested and predicted results are outputted in a digestible dataframe. Results are passed for human review, where compliance officers make adjustments to the machine-annotated predictions. Upon final approval, results are transmitted to the corresponding authority that requested the information. In addition, results are re-populated and stored back in the historical subpoena database. This allows for a capability to continuously generate new, complete labels for the most recently processed subpoenas. This self-feedback loop allows the model to continuously learn and deploy for subpoena processing and resolution in accordance with an exemplary embodiment.

Human in the Loop: Given the importance of fully complying with a subpoena request, a human reviewer must always be involved. In an exemplary embodiment, the method for automated processing and continuous deployment of subpoena extraction models outlines a tool that can help an already arduous task become faster, scalable, and more complete. Since outputs are in a standardized format, reviewers can quickly modify any prediction and linking to correct any potential errors. These final adjustments are reinputted into the system, and this repopulates the historical subpoena database with new documents and a more complete labeled data set. Since the end storage system for cataloging subjects, accounts, and authorities is the same storage system as that used for originally sourcing data, each review plays a critical role in curating more refined samples. The fuzzy matching algorithm is reapplied, augmenting any metadata from the processed document to align our labels better, in a new dataset for training. This allows for an automatic sourcing and retraining when presented with new information from the human reviewers, effectively a closed feedback loop that continuously deploys new models and is always learning to correct itself.

In an exemplary embodiment, a closed feedback loop with a human reviewer to automatically source data, train models, and process subpoena documents with high throughput and accuracy is provided. The pipeline standardizes incoming source documents into processed data frames, which allows for uniform handling of both digital and scanned formats. Training mechanisms are exploited to prioritize recall over precision, effectively allowing for the use of incomplete labels for training. In addition, the model is capable of filling in the blanks. The model knows what could be an address or SSN, and deliberately tags and links the associated tokens, even when a particular token was not originally a known label. Scale is achieved through multi-processing and graphics processing unit (GPU) deployments. Generic extraction algorithms that can handle the inherent diversity of content styles found in subpoenas are also employed.

Accordingly, with this technology, an optimized process for automated processing and continuous deployment of subpoena extraction models so as to ensure accuracy, completeness, and timeliness with respect to compliance with subpoena requirements is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for preparing a response to a subpoena, the method being implemented by at least one processor, the method comprising:
receiving, by the at least one processor, a first subpoena;
extracting, by the at least one processor from the first subpoena, a first plurality of informational requests;
retrieving, by the at least one processor from a memory, a first data set;
analyzing, by the at least one processor, the first data set with respect to the first set of informational requests in order to identify items from within the first data set that are responsive to items included within the first set of informational requests;
generating, by the at least one processor, a report that includes a result of the analyzing; and
transmitting, by the at least one processor to a predetermined destination, the report,
wherein the analyzing comprises providing the first subpoena as an input to a Robustly optimized Bidirectional Encoder Representations from Transformers pre-training approach (ROBERTa) model that uses a sub-word approach to modeling words in a sequential format, and
wherein the ROBERTa model is generated by:
retrieving a plurality of second subpoenas for which responses have previously been generated;
extracting, from each respective second subpoena of the plurality of second subpoenas, a first set of tokens;
determining, for each respective token from within the first set of tokens, a corresponding set of spatial information that relates to a location of the respective token within the respective second subpoena, the corresponding set of spatial information including a pixel offset, a width, a height, a line number, a block association, and an extraction confidence; and
assigning, for each respective token from within the first set of tokens, a corresponding tag that indicates a type of information from among a predetermined set of information types.

2. The method of claim 1, wherein the analyzing comprises applying a fuzzy matching algorithm to link items from within the first data set with items from within the first set of informational requests.

3. The method of claim 1, wherein the ROBERTa model uses a sliding window that includes 64 tokens that include 48 tokens included at an end of a previous window and 16 tokens that occur sequentially after the 48 tokens included at the end of the previous window.

4. The method of claim 1, wherein the ROBERTa model generates, as an output, a calibration score that relates to a confidence level of a linkage of the items from within the first data set with items from within the first set of informational requests.

5. The method of claim 1, wherein the first set of informational requests includes first information that relates to an authority associated with the first subpoena, second information that relates to a subject of the first subpoena, and third information that relates to at least one account associated with the subject of the first subpoena.

6. The method of claim 5, wherein the first information includes at least one from among a requestor name and a requestor address.

7. The method of claim 5, wherein the second information includes at least one from among a name of a person, a name of an organization, an address, a social security number, a tax identification number, and a date of birth.

8. The method of claim 5, wherein the third information includes at least one from among information that relates to a credit card account, information that relates to a debit card account, information that relates to a checking account, and a financial identifier.

9. A computing apparatus for preparing a response to a subpoena, the computing apparatus comprising:
a processor;
a memory; and
a communication interface coupled to each of the processor and the memory,
wherein the processor is configured to:
receive, via the communication interface, a first subpoena;
extract, from the first subpoena, a first plurality of informational requests;
retrieve, from the memory, a first data set;
analyze the first data set with respect to the first set of informational requests in order to identify items from within the first data set that are responsive to items included within the first set of informational requests;
generate a report that includes a result of the analysis; and
transmit the report to a predetermined destination via the communication interface,
wherein the processor is further configured to provide the first subpoena as an input to a Robustly optimized Bidirectional Encoder Representations from Transformers pre-training approach (ROBERTa) model that uses a sub-word approach to modeling words in a sequential format, and
wherein the processor is further configured to generate the ROBERTa model by:
retrieving a plurality of second subpoenas for which responses have previously been generated;
extracting, from each respective second subpoena of the plurality of second subpoenas, a first set of tokens;
determining, for each respective token from within the first set of tokens, a corresponding set of spatial information that relates to a location of the respective token within the respective second subpoena, the corresponding set of spatial information including a pixel offset, a width, a height, a line number, a block association, and an extraction confidence; and
assigning, for each respective token from within the first set of tokens, a corresponding tag that indicates a type of information from among a predetermined set of information types.

10. The computing apparatus of claim 9, wherein the processor is further configured to apply a fuzzy matching algorithm to link items from within the first data set with items from within the first set of informational requests.

11. The computing apparatus of claim 9, wherein the ROBERTa model uses a sliding window that includes 64 tokens that include 48 tokens included at an end of a previous window and 16 tokens that occur sequentially after the 48 tokens included at the end of the previous window.

12. The computing apparatus of claim 9, wherein the ROBERTa model generates, as an output, a calibration score that relates to a confidence level of a linkage of the items from within the first data set with items from within the first set of informational requests.

13. The computing apparatus of claim 9, wherein the first set of informational requests includes first information that relates to an authority associated with the first subpoena, second information that relates to a subject of the first subpoena, and third information that relates to at least one account associated with the subject of the first subpoena.

14. The computing apparatus of claim 13, wherein the first information includes at least one from among a requestor name and a requestor address.

15. The computing apparatus of claim 13, wherein the second information includes at least one from among a name of a person, a name of an organization, an address, a social security number, a tax identification number, and a date of birth.

16. The computing apparatus of claim 13, wherein the third information includes at least one from among information that relates to a credit card account, information that relates to a debit card account, information that relates to a checking account, and a financial identifier.

* * * * *